United States Patent
Kawana

(10) Patent No.: US 10,769,760 B2
(45) Date of Patent: Sep. 8, 2020

(54) IMAGE PROCESSING APPARATUS AND IMAGING APPARATUS THAT PERFORMS A DISTORTION CORRECTION PROCESS

(71) Applicant: TOYOTA JIDOSHA KABUSHIKI KAISHA, Toyota-shi, Aichi-ken (JP)

(72) Inventor: Yuki Kawana, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 120 days.

(21) Appl. No.: 16/109,940

(22) Filed: Aug. 23, 2018

(65) Prior Publication Data
US 2019/0066276 A1 Feb. 28, 2019

(30) Foreign Application Priority Data
Aug. 28, 2017 (JP) .................................. 2017-163580

(51) Int. Cl.
| | |
|---|---|
| G06K 9/00 | (2006.01) |
| G06T 5/00 | (2006.01) |
| G06K 9/20 | (2006.01) |
| G06T 5/20 | (2006.01) |
| H04N 5/357 | (2011.01) |
| H04N 5/217 | (2011.01) |

(52) U.S. Cl.
CPC .......... G06T 5/006 (2013.01); G06K 9/00624 (2013.01); G06K 9/00805 (2013.01); G06K 9/2054 (2013.01); G06T 5/20 (2013.01); H04N 5/217 (2013.01); H04N 5/3572 (2013.01); *G06T 2207/20012* (2013.01)

(58) Field of Classification Search
CPC .. G06T 5/006; G06T 5/20; G06T 7/75; G06T 7/60; B60R 1/00; H04N 7/181; G06K 9/2054; G06K 9/00624; G06K 9/00805; G08B 13/19663; G08B 13/19654; G08B 13/19608
See application file for complete search history.

(56) References Cited

U.S. PATENT DOCUMENTS

| | | | | |
|---|---|---|---|---|
| 8,134,608 | B2 * | 3/2012 | Yamashita | ................ B60R 1/00 348/148 |
| 8,559,675 | B2 * | 10/2013 | Nogami | .................... B60R 1/00 180/167 |
| 8,837,858 | B2 * | 9/2014 | Lee | ......................... G06T 5/001 382/275 |

(Continued)

FOREIGN PATENT DOCUMENTS

| | | |
|---|---|---|
| JP | 2006-279739 A | 10/2006 |
| JP | 2008-191921 A | 8/2008 |
| WO | 2015/048967 A1 | 4/2015 |

*Primary Examiner* — Amir Alavi
(74) *Attorney, Agent, or Firm* — Sughrue Mion, PLLC

(57) ABSTRACT

An image processing apparatus is provided with: an acquirer configured to obtain an image including a first area and a second area, wherein the first area has a distortion that increases with increasing distance from an image center and the second area is in a predetermined angle range with respect to a straight line passing through the image center and extending in a horizontal axis, and the second area has a smaller distortion than that of the first area; and a corrector configured to perform a distortion correction process on the first area and but not to perform the distortion correction process on the second area.

3 Claims, 3 Drawing Sheets

(56) References Cited

U.S. PATENT DOCUMENTS

| | | | |
|---|---|---|---|
| 9,308,862 B2* | 4/2016 | Fujita | B60R 1/00 |
| 9,467,654 B2* | 10/2016 | Kasatani | H04N 7/15 |
| 9,503,639 B2* | 11/2016 | McClatchie | H04N 5/23238 |
| 9,927,607 B2* | 3/2018 | Kobayashi | G02B 13/06 |
| 10,093,233 B2* | 10/2018 | Krokel | G06T 5/006 |
| 10,242,434 B1* | 3/2019 | Holub | G06T 5/006 |
| 2015/0109446 A1* | 4/2015 | Takano | B60R 25/10 |
| | | | 348/148 |
| 2016/0021307 A1* | 1/2016 | Warzelhan | H04N 5/232 |
| | | | 348/143 |
| 2019/0066276 A1* | 2/2019 | Kawana | G06K 9/00805 |

* cited by examiner

FIG. 3A  Horizontal lens characteristic
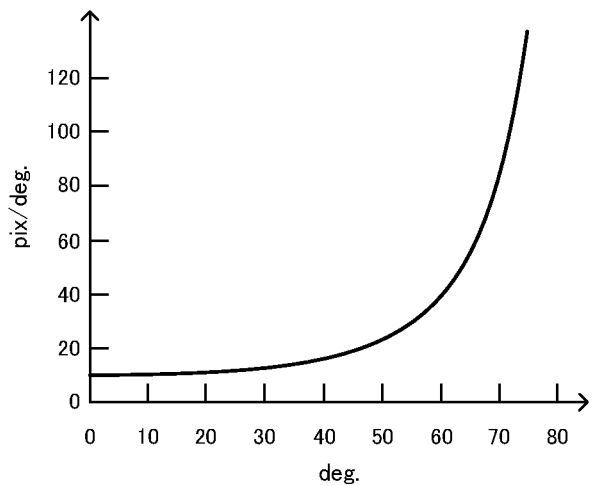
FIG. 3B  Vertical lens characteristic
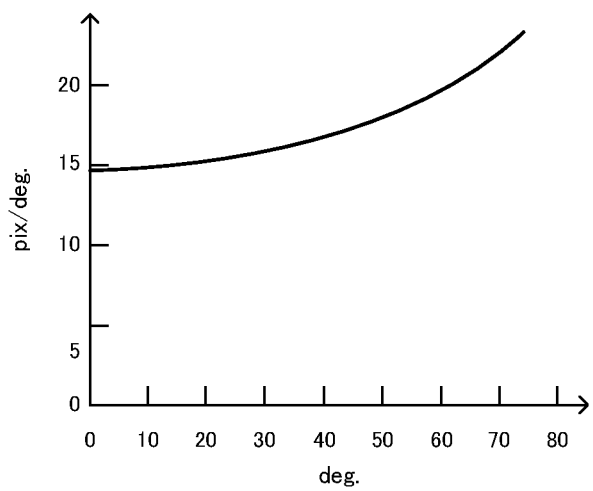
FIG. 3C  Composition ratio for Horizontal-Vertical lens characteristics
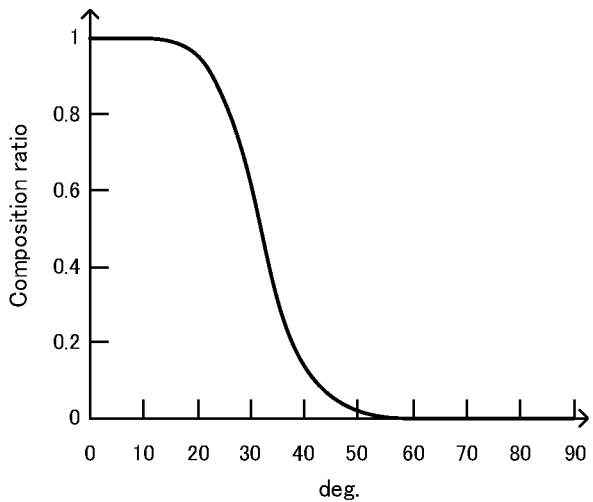

IMAGE PROCESSING APPARATUS AND IMAGING APPARATUS THAT PERFORMS A DISTORTION CORRECTION PROCESS

CROSS-REFERENCE TO RELATED APPLICATIONS

This application is based upon and claims the benefit of priority of the prior Japanese Patent Application No. 2017-163580, filed on Aug. 28, 2017, the entire contents of which are incorporated herein by reference.

BACKGROUND

1. Technical Field

Embodiments of the present disclosure relate to an image processing apparatus and an imaging apparatus.

2. Description of the Related Art

For this type of apparatus, for example, there is proposed an apparatus configured to correct image data, which is photographed or imaged through a fish-eye lens, to distortion-free image data, and configured to output it (refer to Japanese Patent Application Laid Open No. 2006-279739 (Patent Literature 1)).

In a technical field for vehicle safety, for example, an obstacle that is around a vehicle may be recognized from an image(s) photographed or imaged by an imaging apparatus mounted on the vehicle. Moreover, for example, a braking control and a steering control may be automatically performed to avoid a collision with the recognized obstacle.

By the way, the image photographed by the imaging apparatus may have a distortion caused by a lens characteristic of the imaging apparatus to some extent. Thus, before the obstacle is recognized from the image, as described in the Patent Literature 1, a distortion correction is performed on the photographed image in many cases.

As a result, there may be a deviation (i.e., a time lag) at least by a processing time associated with the distortion correction, from a time point at which the image is photographed to a time point at which the obstacle is recognized on the basis of the image. From a point of view of a vehicle safety technique, it is desired to reduce the time lag.

SUMMARY

In view of the aforementioned problems, it is therefore an object of embodiments of the present disclosure to provide an image processing apparatus and an imaging apparatus that are configured to suppress a time required for the distortion correction performed on the photographed image.

The above object of embodiments of the present disclosure can be achieved by an image processing apparatus is provided with: an acquirer configured to obtain an image including a first area and a second area, wherein the first area has a distortion that increases with increasing distance from an image center and the second area is in a predetermined angle range with respect to a straight line passing through the image center and extending in a horizontal axis, and the second area has a smaller distortion than that of the first area; and a corrector configured to perform a distortion correction process on the first area and but not to perform the distortion correction process on the second area.

The above object of embodiments of the present disclosure can be achieved by an imaging apparatus provided with: an imaging element; and a free-curved surface lens configured to form an image on said imaging element, wherein the image includes a first area having a distortion that increases with increasing distance from a center, and the image includes a second area that is in a predetermined angle range with respect to a straight line passing through the center and extending in a horizontal axis, and the second area has a smaller distortion than that of the first area.

BRIEF DESCRIPTION OF THE DRAWINGS

FIG. 3A is a characteristic diagram illustrating an example of a lens characteristic of the camera according to the embodiment;

FIG. 3B is a characteristic diagram illustrating an example of the lens characteristic of the camera according to the embodiment;

FIG. 3C is a characteristic diagram illustrating an example of the lens characteristic of the camera according to the embodiment;

DETAILED DESCRIPTION OF THE EMBODIMENTS

A camera according to an embodiment, as an example of the imaging apparatus according to embodiments of the present disclosure, and an imaging apparatus according to the embodiment will be explained with reference to FIG. 1 to FIG. 5C.

(Configuration)

Figure 1:
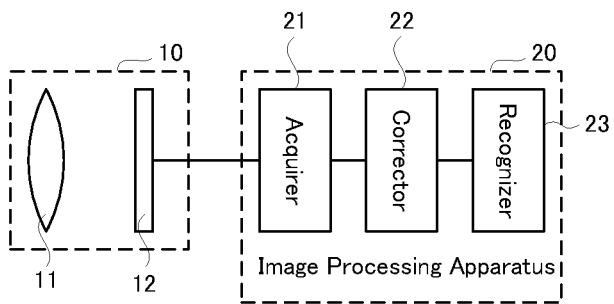
FIG. 1 is a block diagram illustrating configurations of a camera and an image processing apparatus according to an embodiment.

The camera and the image processing apparatus according to the embodiment will be explained with reference to FIG. 1. FIG. 1 is a block diagram illustrating configurations of the camera and the image processing apparatus according to the embodiment. Here, it is premised that the camera and the image processing apparatus according to the embodiment are mounted on a vehicle.

In FIG. 1, a camera 10 is provided with a free-curved surface lens 11 and an imaging element 12. The camera 10 may be mounted on the vehicle, for example, to photograph or image a predetermined range ahead of the vehicle. An image processing apparatus 20 is provided with a corrector 22 and a recognizer 23, as processing blocks logically realized therein, or processing circuits physically realized therein. The corrector 22 is configured to perform a distortion correction process on an image photographed by the camera 10. The recognizer 23 is configured to perform a recognition process of recognizing an object that is around the vehicle, e.g., a pedestrian, a bicycle, another vehicle, a structure, etc., from the image photographed by the camera 10. The existing various aspects can be applied to the distortion correction process and the recognition process, and thus, a detailed explanation of the processes will be omitted.

(Photographed Image)

Figure 2:
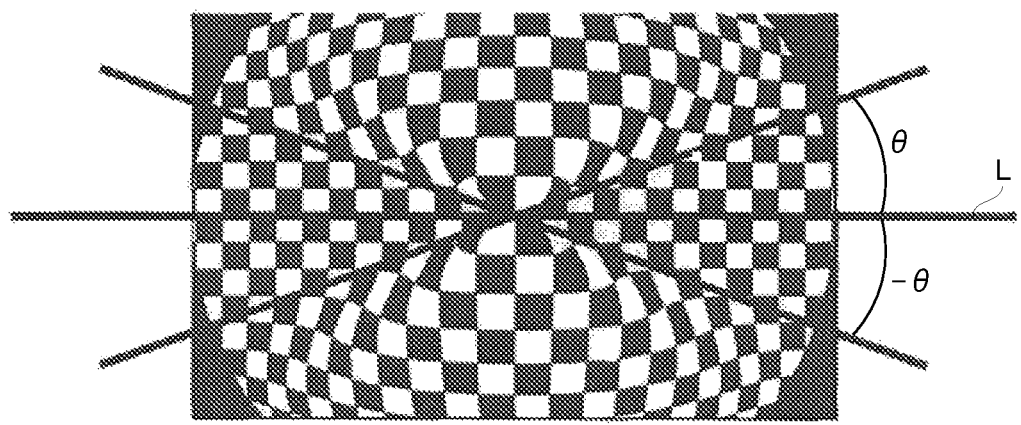
FIG. 2 is a diagram illustrating a distortion of an image targeted by the image processing apparatus according to the embodiment.

Next, the image photographed by the camera 10 will be explained with reference to FIG. 2. FIG. 2 is a diagram illustrating a distortion of an image targeted by the image processing apparatus according to the embodiment.

In FIG. 2, an area in a predetermined angle range (±θ) with respect to a straight line L passing through an image center and extending in a horizontal direction is an area with a distortion small enough to be regarded as no practical distortion. This area will be referred to as a "horizontal wide viewing angle area" as occasion demands. An area other than the horizontal wide viewing angle area in the image is an area in which the distortion increases with increasing distance from the image center.

(Lens Characteristic)

The free-curved surface lens 11 of the camera 10 may be formed to photograph the image with the aforementioned characteristics. Specifically, the free-curved surface lens 11 may have, for example, a lens characteristic obtained by combining or composing a horizontal lens characteristic illustrated in FIG. 3A and a vertical lens characteristic illustrated in FIG. 3B in accordance with a ratio depending on an azimuth angle on a plane perpendicular to an optical axis. The free-curved surface lens 11 having such a lens characteristic forms an image on the imaging element 12, wherein the image includes the area that is in the predetermined angle range with respect to the straight line passing through the image center and that has the distortion small enough to be regarded as no practical distortion, and the image includes the area in which the distortion increases with increasing distance from the image center.

In FIG. 3C, a composition ratio "1" means "horizontal lens characteristic vertical lens characteristic=1:0". Therefore, a composition ratio "0" means "horizontal lens characteristic:vertical lens characteristic=0:1". The "horizontal lens characteristic", the "vertical lens characteristic", and the "composition ratio" illustrated in FIG. 3A to FIG. 3C are an example. It is possible to form the free-curved surface lens 11 by which an image with the characteristic explained by using FIG. 2 can be photographed, even by using a lens characteristic and a composition ratio that are different from the "horizontal lens characteristic", the "vertical lens characteristic", and the "composition ratio" illustrated in FIG. 3A to FIG. 3C.

(Image Processing)

Next, image processing performed by the image processing apparatus 20 will be explained with reference to a flowchart in FIG. 4.

Figure 4:
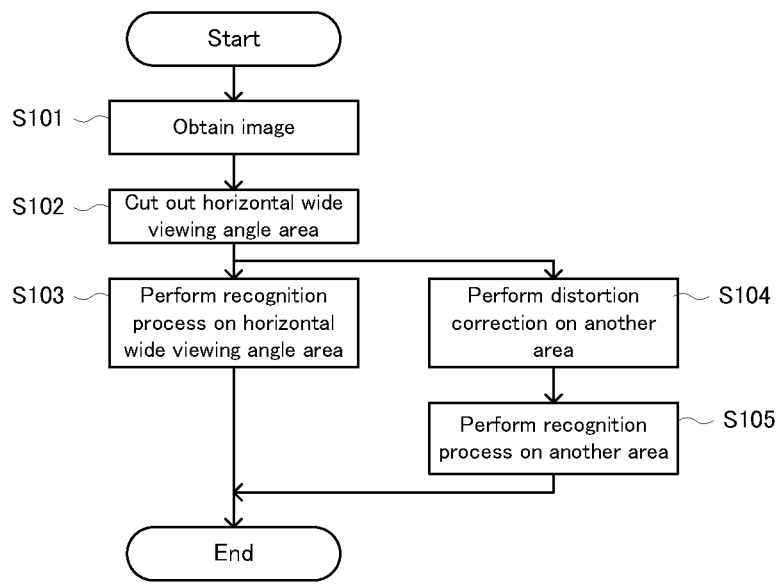
FIG. 4 is a flowchart illustrating image processing according to the embodiment.

In FIG. 4, an acquirer 21 of the image processing apparatus 20 obtains an image as an output of the imaging element 12 of the camera 10 (step S101). The corrector 22 cuts the horizontal wide viewing angle area out of the obtained image (refer to FIG. 5A) (i.e., so-called trimming) (step S102).

Figure 5A:
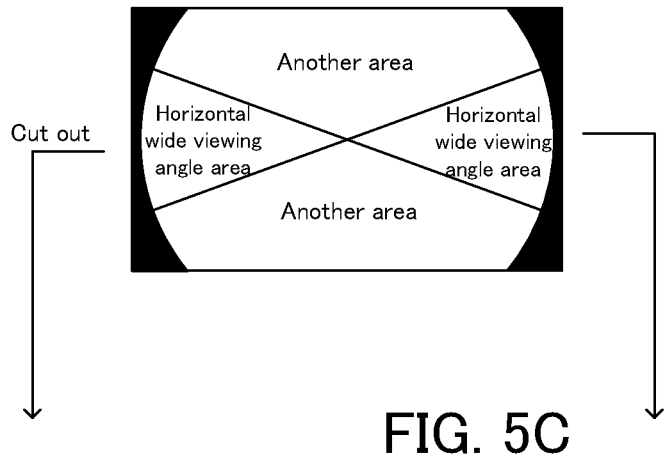
FIG. 5A is a diagram for explaining a concept of the image processing according to the embodiment.
Figure 5B:
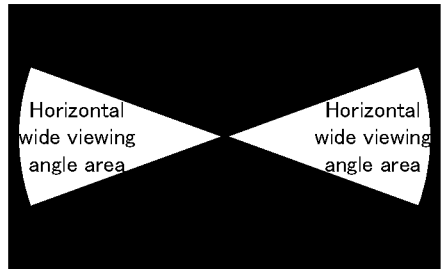
FIG. 5B is a diagram for explaining the concept of the image processing according to the embodiment.
Figure 5C:
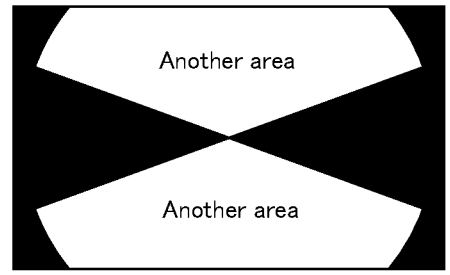
FIG. 5C is a diagram for explaining the concept of the image processing according to the embodiment.

As a result, an image including only the horizontal wide viewing angle area illustrated in FIG. 5B is generated, and an image with the horizontal wide viewing angle area being cut out of the obtained image (refer to FIG. 5C) is generated. The horizontal wide viewing angle area to cut out can be specified in advance from the lens characteristic of the free-curved surface lens 11.

The corrector 22 may transmit the image including only the horizontal wide viewing angle area to the recognizer 23, without performing the distortion correction process on the image including only the horizontal wide viewing angle area. The recognizer 23 performs the recognition process on the image including only the horizontal wide viewing angle area (step S23).

On the other hand, the corrector 22 performs the distortion correction process on the image with the horizontal wide viewing angle area being cut out (step S104). The corrector 22 may transmit the image on which the distortion correction process is performed, to the recognizer 23. The recognizer 23 performs the recognition process on the image on which the distortion correction process is performed (step S105).

A result of the recognition process performed by the recognizer 23 may be used, for example, for a process associated with a collision damage reducing brake, or the like.

Technical Effect

To improve vehicle safety, a camera configured to photograph ahead of a vehicle is often mounted. The camera mounted on the vehicle may be, in many cases, a camera that has a wide viewing angle lens and that can photograph a central vision with high resolution. An image photographed by this type of camera is significantly distorted in a wide viewing angle area due to a characteristic of the wide viewing angle lens. It is thus necessary to perform the distortion correction process on the image before the recognition process, which is to recognize an object, such as, for example, a pedestrian, from the photographed image. Enhancement of the resolution of an imaging element of the camera increases the number of pixels that form the image and increases a time required for the distortion correction process.

By the way, an area that is relatively close to an edge of the image, which is herein particularly a left edge and a right edge, may show an object that is relatively close to the vehicle. If the area that is relatively close to the edge of the image shows a bicycle jumping out of shade, it takes a relatively short time for the bicycle to collide with the vehicle, from when the bicycle is shown or reflected in the image. It is therefore desired to reduce a time required for the recognition of the object, which is shown or reflected in the image, from when the image is photographed, and it is moreover desired to reduce a time until a control based on a recognition result is performed.

The horizontal wide viewing angle area according to the embodiment (refer to FIG. 5A to FIG. 5C) is an area in which the object that is diagonally ahead of the vehicle is expected to be shown or reflected. In the embodiment, as described above, the recognition process is performed on the horizontal wide viewing angle area without the distortion correction process (refer to the flowchart in FIG. 4). Particularly in the embodiment, the recognition process is performed on the horizontal wide viewing angle area without waiting for an end of the distortion correction process that is performed on the image with the horizontal wide viewing angle area being cut out (refer to FIG. 5C). As a result, the time required for the distortion correction process is saved, and the object that is diagonally ahead of the vehicle can be recognized relatively early.

The image with the horizontal wide viewing angle area being cut out has a relatively small number of pixels on which the distortion correction process is to be performed. It is thus possible to suppress the time required for the distortion correction process.

The "another area" included in the image with the horizontal wide viewing angle area being cut out (refer to FIG. 5C) is an area that has a distortion caused by the lens characteristic, as illustrated in FIG. 2. If the distortion correction process is performed on the image with the horizontal wide viewing angle area being cut out, an object that is shown or reflected near the center of the image is represented with relatively high resolution, i.e., with a relatively large number of pixels. The object represented with the relatively high resolution can be relatively easily recognized by the recognition process. Here, an object that is relatively far from the vehicle is shown or reflected near the center of the image. Therefore, the distortion correction process is performed on the image with the horizontal wide viewing angle area being cut out, by which the object that is relatively far from the vehicle can be appropriately recognized.

As described above, the image processing apparatus 20 according to the embodiment is configured to relatively early recognize the object that is diagonally ahead of the vehicle, and is configured to appropriately recognize the object that is relatively far from the vehicle.

Various aspects of embodiments of the present disclosure derived from the embodiments explained above will be explained hereinafter.

An image processing apparatus according to an aspect of embodiments of the present disclosure is provided with: an acquirer configured to obtain an image including a first area and a second area, wherein the first area has a distortion that increases with increasing distance from an image center and the second area is in a predetermined angle range with respect to a straight line passing through the image center and extending in a horizontal axis, and the second area has a smaller distortion than that of the first area; and a corrector configured to perform a distortion correction process on the first area and but not to perform the distortion correction process on the second area.

On the image processing apparatus in the above aspect, the distortion correction process is not performed on the second area of the image. Thus, even if the distortion correction process is not performed on the first area of the image, it is possible to reduce the time required for the distortion correction process, in comparison with when the distortion correction process is performed on the entire image. It is therefore possible to suppress the time required for the distortion correction process, which is performed on the image.

The "horizontal wide viewing angle area" and the "another area" according to the embodiment are respectively an example of the "second area" and the "first area". The "acquirer 21" and the "corrector 22" according to the embodiment are respectively an example of the "acquirer" and the "corrector".

The image processing apparatus associated with the aspect may be further provided with a recognizer configured to separately perform an object recognition process on the first area on which the distortion correction process is performed, and the object recognition process on the second area.

The object recognition process is performed on an image that has a relatively small distortion or no distortion, e.g., an image on which the distortion correction process is performed. On the image processing apparatus, as described above, the distortion correction process is not performed on the second area that has a relatively small distortion. Thus, if the object recognition process to be performed on the second area is performed without waiting for an end of the distortion correction process performed on the first area, it is possible to recognize an object that is shown or reflected in the second area relatively early. The "recognizer 23" according to the embodiment is an example of the "recognizer".

If the image including the first area and the second area, which are targeted by the image processing apparatus, is photographed by an imaging apparatus mounted on a vehicle, the second area mainly shows an object that is diagonally ahead of the vehicle. If the image processing apparatus is configured in the above manner, it is then possible to relatively early recognize, for example, a pedestrian, a bicycle, or the like, which is jumping out in front of the vehicle from the side of the vehicle. It is extremely useful from the point of view of the vehicle safety technique.

An imaging apparatus according to an aspect of embodiments of the present disclosure is provided with: an imaging element; and a free-curved surface lens configured to form an image on the imaging element, wherein the image includes a first area having a distortion that increases with increasing distance from a center, and the image includes a second area that is in a predetermined angle range with respect to a straight line passing through the center and extending in a horizontal axis, and the second area has a smaller distortion than that of the first area.

On the imaging apparatus according to the above aspect, it is possible to photograph the image including the second area, which has a smaller distortion than that of the first area. If such an image is photographed, it is possible to suppress the time required for the distortion correction process performed on the image.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. An image processing apparatus, which is mounted on a first movable body and which recognizes a second movable body moving around the first movable body from a photographed image of an area around the first movable body, comprising:
at least one processing circuit, programmed to:
obtain an image including a first area and a second area, wherein the first area has a distortion that increases with increasing distance from an image center and the second area is in a predetermined angle range with respect to a straight line passing through the image center and extending in a width direction which is a direction crossing a vertical direction of the first movable body, and the second area has a smaller distortion than that of the first area as the photographed image; and
perform a distortion correction process on the first area and but not to perform the distortion correction process on the second area.

2. The image processing apparatus according to claim 1, wherein the at least one processing circuit is further programmed to separately perform an object recognition process on the first area on which the distortion correction process is performed, and the object recognition process on the second area in order to recognize the second movable body.

3. An imaging apparatus, which is mounted on a first movable body and which outputs an image of an area around the first movable body to an image processing apparatus configured to recognize a second movable body moving around the first movable body, comprising:
- a camera; and
- a free-curved surface lens of the camera configured to form an image, wherein the image includes a first area having a distortion that increases with increasing distance from a center, and the image includes a second area that is in a predetermined angle range with respect to a straight line passing through the center and extending in a width direction which is a direction crossing a vertical direction the first movable body, and the second area has a smaller distortion than that of the first area.

* * * * *